United States Patent [19]

Weterings et al.

[11] 4,450,142

[45] May 22, 1984

[54] PROCESS FOR RECOVERING A URANIUM-CONTAINING CONCENTRATE AND PURIFIED PHOSPHORIC ACID

[75] Inventors: Cornelis A.M. Weterings, Stein; Johannes A. Janssen, Schinveld, both of Netherlands

[73] Assignee: Stamicarbon B.V., Geleen, Netherlands

[21] Appl. No.: 285,322

[22] Filed: Jul. 22, 1981

[30] Foreign Application Priority Data

Jul. 23, 1980 [NL] Netherlands ................. 8004221

[51] Int. Cl.$^3$ .................................................. C01G 43/00
[52] U.S. Cl. ................................. 423/8; 423/11; 423/321 S
[58] Field of Search ................. 423/8, 11, 321 S

[56] References Cited

U.S. PATENT DOCUMENTS

| | | | |
|---|---|---|---|
| T952002 | 11/1976 | Walters | 71/34 |
| 2,873,165 | 2/1959 | Bales et al. | 423/18 |
| 3,366,448 | 1/1968 | Martin et al. | 23/165 |
| 3,862,298 | 1/1975 | Beltz et al. | 423/659 |
| 3,880,980 | 4/1975 | Wamser | 423/8 |
| 3,894,143 | 7/1975 | Von Semel et al. | 423/313 |
| 3,937,783 | 2/1976 | Wamser et al. | 423/8 |
| 3,965,238 | 6/1976 | Tabata et al. | 423/8 |
| 4,046,860 | 9/1977 | Kidde | 423/321 R |
| 4,070,443 | 1/1978 | Kikuchi et al. | 423/321 R |
| 4,152,402 | 5/1979 | Walters et al. | 423/321 S |
| 4,180,545 | 12/1979 | McCullough et al. | 423/8 |
| 4,236,911 | 12/1980 | McCullough et al. | 423/321 S |

FOREIGN PATENT DOCUMENTS

| | | | |
|---|---|---|---|
| 1342344 | 1/1974 | United Kingdom | 423/321 S |
| 1344651 | 1/1974 | United Kingdom | 423/321 S |
| 1556478 | 11/1979 | United Kingdom | 423/321 S |

*Primary Examiner*—Edward A. Miller
*Attorney, Agent, or Firm*—Cushman, Darby & Cushman

[57] ABSTRACT

A process is described for the removal of uranium values from contaminated wet-process phosphoric acid solutions using an addition thereto of first an aliphatic ketone and then an inorganic fluoride, whereby high efficiencies in the removal of uranium as a solid, filterable precipitate are achieved.

6 Claims, No Drawings

PROCESS FOR RECOVERING A URANIUM-CONTAINING CONCENTRATE AND PURIFIED PHOSPHORIC ACID

The invention relates to a process for recovering a uranium-containing concentrate and purified phosphoric acid from wet-process phosphoric acid. This process involves treating wet-process phosphoric acid with an aliphatic ketone and an inorganic fluoride compound in the presence of a reducing agent, separating off the uranium-containing precipitate thus formed and then separating the ketone from the remaining mixture of phosphoric acid and aliphatic ketone to obtain a purified phosphoric acid.

Wet process phosphoric acid will be understood as a more or less crude aqueous phosphoric acid obtained from the already known digestion of phosphate ores.

A process of this general kind is described in our previously-filed co-pending U.S. patent application Ser. No. 115,248 filed Jan. 21, 1980, the disclosure of which is incorporated herein by reference. In the process there described, first an inorganic fluorine compound is added to the wet-process phosphoric acid and next an organic dispersant, for instance an aliphatic ketone. While that process yields a good uranium precipitation efficiency, it has the disadvantage that to obtain a uranium precipitation efficiency in excess of 90% rather larger amounts of ketone are required, for instance 150–450% by weight, calculated with respect to the weight amount of $P_2O_5$ in the phosphoric acid. The ketone must then be recovered from the phosphoric acid, for instance by distillation or rectification, and this not only requires a relatively large amount of energy and large equipment, but is also attended by significant losses of ketone.

The present invention provides a process whereby the uranium values present in wet-process phosphoric acid can be separated off at very high efficiencies, and by which this can be achieved using a substantially smaller amount of aliphatic ketone.

According to the present invention, this is achieved by first adding the aliphatic ketone to the wet-process phosphoric acid, followed by treatment with the inorganic fluoride compound.

The inorganic fluoride compound may be anyone of various soluble alkali or alkaline earth metal fluorides or silicofluorides may be employed. Advantageously, however, ammonium fluoride is used. The aliphatic ketone should be a lower alkyl ketone having up to 4 carbon atoms. Acetone is advantageously employed, but methylethylketone may also be used.

The relative amounts of fluoride compound and aliphatic ketone may vary within wide limits. To obtain a uranium precipitation efficiency above 90%, when applying an amount of 1.5–5% by weight of fluoride compound, calculated as fluorine, use is made of 200–20% by weight of ketone, both calculated in relation to the amount by weight of $P_2O_5$ in the phosphoric acid. By preference, use is made of 2–4% by weight of fluoride compound, calculated as fluorine, and 100–25% by weight of ketone, both calculated in relation to the amount of weight of $P_2O_5$ in the phosphoric acid.

As the reducing agent for the reduction of the uranium from the hexavalent to the tetravalent state, powdered metallic iron, zinc or aluminum may, inter alia, be used. Optionally, an electrolytical reduction technique may be employed.

In principle, the process according to the invention can be applied to any kind of wet-process phosphoric acid. Both the so-called green wet-process phosphoric acid (obtained from calcined rock phosphate) and the so-called black wet-process phosphoric acid (which contains a quantity of organic contaminants) can be subjected to the process, even without having undergone a prior treatment. Likewise, without any other treatment being required, the process can be employed with both dilute phosphoric acid (the so-called filter-grade acid) and concentrated phosphoric acid, and even to so-called superphosphoric acids.

For most effective results, the phosphoric acid concentration (measured as $P_2O_5$) should be between 30 and 60%, advantageously 45 to 55%, by weight.

It has further been found that when starting from a phosphoric acid having a low sulphate content, an even smaller amount of inorganic fluoride compound and/or ketone will suffice to obtain a certain uranium precipitation efficiency. It is therefore advantageous to have the sulphate content of the wet-process phosphoric acid set at an initial level of below about 0.6% by weight, calculated on the basis of the amount of $P_2O_5$ in the phosphoric acid. Where necessary, this may be achieved by first adding a compound which reacts with sulphate ions to form a sulphate compound insoluble in phosphoric acid and separating off the sulphate-containing precipitate thereby formed. Examples of such sulphate precipitants include oxides and inorganic salts, such as carbonates, sulphides, nitrates, phosphates and chlorides, of bivalent alkaline earth metals, such as calcium, magnesium or barium. When using a calcium compound in this step, it is advantageous to have such sulphate precipitation proceed in the presence of a part of the aliphatic ketone, which is also described in the above-mentioned U.S. patent application Ser. No. 115,248, filed Jan. 21, 1980.

The uranium-containing precipitate formed in this process also contains a major part of the yttrium and rare-earth metals present in the wet-process phosphoric acid, such as lanthanum, cerium, neodymium and ytterbium, as well as a substantial part of the vanadium. This precipitate can then be separated from the mixture of phosphoric acid and ketone by, for instance, filtration and/or centrifugation. The separated uranium-containing concentrate can then be further upgraded in various ways already known in themselves, as desired.

Removal and recovery of the ketone from the remaining mixture of phosphoric acid, ketone and water, after separation of the uranium-containing precipitate, can be effected in various ways, for instance by distillation, decantation or extraction, after which the separated ketone, optionally after further treatment, such as rectification, can be recirculated to the precipitation step.

The resulting purified phosphoric acid can then be used for various purposes, for instance, as a raw material for the preparation of high-grade fertilizer products, technical phosphates and animal-feed phosphate.

In general, the method of this invention is carried out at ambient temperatures, generally from, say, 5° to 35° C. and the required reactions take place in a short time with simple stirring or agitation of the solution mixture. In any given case, the optimum reaction time is readily established by simple experiment, determining the removal efficiency of the uranium content.

The invention will be further elucidated in the following Examples.

EXAMPLE 1

An amount of 100 grams of wet-process phosphoric acid, of the composition given in the table below, was introduced into a vessel. Subsequently, 100 mg of finely divided iron powder was added and the mixture was stirred for 30 minutes. Whilst the liquid was being stirred, 52 grams of acetone was added to it, and subsequently 3.12 grams of solid ammonium fluoride. After about 10 minutes, the mixture was centrifuged, the clear upper solution layer was separated from the precipitate and the latter was washed with acetone.

An amount of 5.2 grams of solid product containing 3340 ppm of uranium was obtained. The clear upper layer was mixed with the acetone-containing wash liquid obtained from washing out the precipitate and vacuum-distilled, yielding acetone as top product and as bottom product an aqueous phosphoric acid solution the composition of which is also given in the table below.

|  | Original Phosphoric Acid | Product Phosphoric Acid |
| --- | --- | --- |
| $P_2O_5$ | 52% by weight | 53% by weight |
| V | 225 ppm | 171 ppm |
| Y | 46 ppm | 2 ppm |
| La* | 80 ppm | 2 ppm |
| U | 180 ppm | 5 ppm |

La* is here understood to mean the rare-earth metals

From these analytical results it is evident that the larger part of the uranium, yttrium and rare earths originally present, as well as a substantial part of the vanadium have been precipitated from the phosphoric acid. The uranium precipitation efficiency was 97%.

EXAMPLE 2

(Comparative Example)

The procedure of Example 1 was repeated, except that in this instance, after the reduction the ammonium fluoride was first introduced, and thereafter acetone was added. After centrifugation, 6.1 grams of a solid product precipitate was recovered having a uranium content of 1920 ppm. In this case, the uranium precipitation efficiency was 65%.

EXAMPLE 3

The procedure of Example 1 was again repeated, but now the amount of acetone was 78 grams.

An amount of 6.7 grams of solid precipitate having a uranium content of 2890 ppm was obtained. The uranium precipitation efficiency was 98%.

EXAMPLE 4

(Comparative Example)

The procedure of Example 3 was repeated, but with the addition ammonium fluoride preceding that of acetone. An amount of 7.35 grams of solid precipitate having a uranium content of 2350 ppm was obtained. The uranium precipitation efficiency was 96%.

EXAMPLE 5

The procedure of Example 1 was again repeated, but using only 26 grams of acetone.

An amount of 5.0 grams of solid precipitate having a uranium content of 3460 ppm was obtained. The uranium precipitation efficiency was 96%.

EXAMPLE 6

(Comparative Example)

The procedure of Example 5 was repeated, but with the ammonium fluoride introduced before the acetone was added. The uranium precipitation efficiency here was less than 40%.

EXAMPLE 7

The procedure of Example 1 was again repeated, but using 78 grams of acetone and 2.08 grams of ammonium fluoride.

An amount of 5.25 grams of solid precipitate having a uranium content of 2950 ppm was obtained. The uranium precipitation efficiency was over 86%.

EXAMPLE 8

(Comparative Example)

The procedure of Example 7 was repeated, but with the ammonium fluoride added before the acetone. An amount of 5.2 grams of precipitate having a uranium content of 2450 ppm was obtained. The uranium precipitation efficiency here was 71%.

EXAMPLE 9

An amount of 100 grams wet-process phosphoric acid of the composition given in the left-hand column of the above table, but also having a sulphate content of 2.6% by weight was introduced into a beaker. Whilst this acid was being stirred, 4.4 grams of solid $BaCO_3$ was added. After 1 hour's settling the precipitate formed was filtered off.

The filtrate was next treated in the same way as in Example 1 using iron powder (100 mg), acetone (26 grams) and subsequently ammonium fluoride (2.6 grams). After centrifuging and washing 3.1 grams of solid precipitate having a uranium content of 5570 ppm was obtained. The uranium precipitation efficiency was 96%.

The process of the foregoing Examples may also be followed but replacing the ammonium fluoride with sodium or potassium fluoride, or e.g., sodium silicofluoride. Similar results will be achieved. The only significant difference in replacing acetone with methylethylketone is increased expense in subsequently recovering the higher boiling material.

What is claimed is:

1. A process for recovering a uranium-containing concentrate and purified phosphoric acid from wet-process phosphoric acid in the presence of a reducing agent effective to reduce uranium VI to uranium IV by treatment with first a lower alkyl ketone in the presence of said reducing agent, and thereafter adding, with agitation, an inorganic fluoride compound and separating off the uranium-containing precipitate, wherein said treatment and addition is conducted at ambient temperatures.

2. Process according to claim 1, wherein there is used from 1.5 to 5% by weight of said fluoride compound, calculated as fluorine, and from 200 to 20% by weight of said ketone, both calculated with respect to the amount by weight of $P_2O_5$ in the wet-process phosphoric acid.

3. Process according to claim 2, wherein said amount of fluoride compound is from 2 to 4%, and said amount of ketone is from 100 to 25%.

4. Process according to any one of claims 1, 2 or 3, wherein the sulphate content of the said wet-process phosphoric acid to be treated is set at a value below about 0.6% by weight, calculated in relation to the amount by weight of $P_2O_5$ in said wet-process phosphoric acid, by first adding an inorganic alkaline earth metal oxide or salt, to react with sulphate ions content to form an insoluble sulphate precipitate and then separating off the sulphate-containing precipitate formed.

5. A process for recovering a uranium-containing concentrate and purified phosphoric acid from wet-process phosphoric acid consisting essentially in the combination of steps of:

(i) setting the sulfate ion content of the said wet-process phosphoric acid at a value below about 0.6% by weight, calculated in relation to the amount by weight of $P_2O_5$ in said wet-process phosphoric acid, by first adding an inorganic alkaline earth metal oxide or salt to react with said sulfate ions to form an insoluble sulphate precipitate, and then separating off the sulphate-containing precipitate formed;

(ii) treating the remaining wet-process phosphoric acid with from 200 to 20% by weight a lower alkyl ketone, calculated with respect to the amount by weight of $P_2O_5$ in the wet-process phosphoric acid, in the presence of a reducing agent effective to reduce uranium VI to uranium IV; and (iii) thereafter adding, with agitation, from 1.5 to 5% by weight of an inorganic fluoride, calculated as fluorine, with respect to the amount by weight of $P_2O_5$ in the wet-process phosphoric acid, and separating off the uranium containing precipitate, said treatment and addition being conducted at about 5° C. to about 35° C.

6. Process according to claim 5 wherein said amount of fluoride compound is from 2 to 4% and said amount of ketone is from 100 to 25%.

* * * * *